US005888046A

United States Patent [19]

Salda et al.

[11] Patent Number: 5,888,046

[45] Date of Patent: Mar. 30, 1999

[54] MACHINE FOR COLLECTING USED CUPS

[75] Inventors: Luciano Salda; Guido Iattoni, both of Vignola, Italy

[73] Assignee: C.M.S. S.p.A., Marano Sul Panaro, Italy

[21] Appl. No.: 605,199

[22] PCT Filed: Jan. 17, 1996

[86] PCT No.: PCT/EP96/00182

§ 371 Date: Nov. 22, 1996

§ 102(e) Date: Nov. 22, 1996

[87] PCT Pub. No.: WO96/22582

PCT Pub. Date: Jul. 25, 1996

[30] Foreign Application Priority Data

Jan. 20, 1995 [EP] European Pat. Off. .............. 95830016

[51] Int. Cl.[6] .................................................... B65G 57/20

[52] U.S. Cl. .................... 414/788.2; 194/205; 414/790.5

[58] Field of Search .................................... 194/205, 208, 194/209, 212, 213; 414/788.2, 788.9, 790.5; 53/142, 531, 540

[56] References Cited

U.S. PATENT DOCUMENTS

| | | | |
|---|---|---|---|
| 4,094,345 | 6/1978 | Deziel | 414/788.2 X |
| 4,545,714 | 10/1985 | Johnson et al. | 414/788.2 |
| 4,896,024 | 1/1990 | Morello et al. | 235/381 |
| 5,484,254 | 1/1996 | Schiffelholz | 414/788.2 |
| 5,577,590 | 11/1996 | Salda | 194/209 |

FOREIGN PATENT DOCUMENTS

| | | |
|---|---|---|
| 2692459 | 12/1993 | France . |
| 43 11 845 A1 | 10/1994 | Germany . |
| WO 93/03460 | 2/1993 | WIPO . |
| WO 96/22582 | 7/1996 | WIPO . |

*Primary Examiner*—F. J. Bartuska
*Attorney, Agent, or Firm*—Burns, Doane, Swecker & Mathis, L.L.P.

[57] ABSTRACT

The machine for collecting used cups enables collection of the cups in a container (2) in such a way as to reduce empty spaces between cups and thus better to utilize the volume of the container (2). A inlet for the cups, through which a cup (6) is inserted into the machine, is connected with a container (2) by means of a track, internal of the machine, on which an operative group (1) is positioned, which operative group (1) comprises a tubular body (11) for guiding a cup (6) on to a stack (9) of cups. The operative group (1) is mobile between a loading position, in which a stack (9) of cups (6) is created, and at least one unloading position, in which the stack (9) is unloaded into the container (2).

15 Claims, 3 Drawing Sheets

MACHINE FOR COLLECTING USED CUPS

DESCRIPTION

The invention relates to a machine for collecting plastic and paper cups or the like, both of the single-use and of the reusable types.

The machine comprises: an identification device of the type of cup suitable for acceptance by the machine; a dispenser for supplying a coin to a user in return for introduction of an acceptable cup; an inlet for the cups, through which a cup is introduced into the machine; a container, situated internally of the machine, in which the cups are collected once accepted; an internal track connecting the inlet for the cups with the container. Machines of this type are described in European Patents Nos. 94830165.0 and 94830589.1, both belonging to the same Applicant.

The main aim of the present invention to to provide a machine which is constructionally simple and economical and which permits of collecting the cups in the container in such a way as to reduce the empty spaces between one cup and another, and thus of exploiting the container volume more rationally than in known machines.

One advantage of the present invention is that it permits both of less frequent emptying of the container, and of the use of a somewhat smaller container than in known machines.

A further advantage is that the accumulated cups in the container are stacked in such a way as considerably to facilitate their subsequent transport towards a cleaning or destruction point. The invention also obviates hygienic problems which might arise due to the presence of drinks or foods residues left in the cups; this advantage extends to during the subsequent transport of the cups for destruction or cleaning.

The above advantages and more besides are all achieved by the machine of the invention, as it is characterized in the claims that follow, which comprises an operative group, arranged along the transport track and crossed by the transiting cups along the track itself, which operative group composes a stack of cups and locates said stack in a predetermined position internally of a container.

Further characteristics and advantages of the present invention will better emerge from the detailed description that follows, of an embodiment of the invention, illustrated in the form of a non-limiting example in the accompanying drawings, in which.

Figure 1:
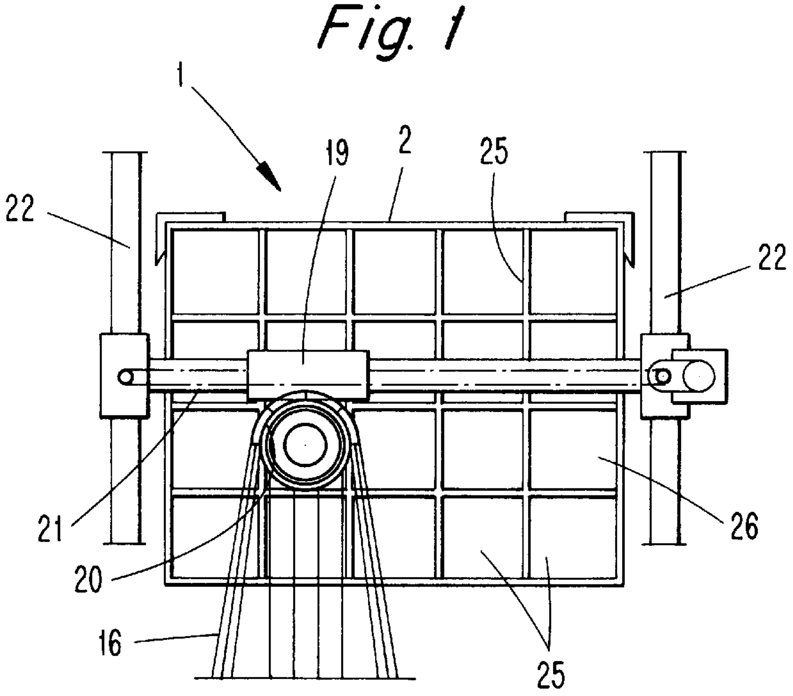
FIG. 1 shows a schematic view from above of a detail of the machine, comprising the operative group 1.

The machine comprises an inlet for the cups, through which a cup 6 is introduced into the machine.

The machine further comprises an identification device of the type of cup 6 which the machine will accept, which device, once it has recognised and accepted the type of cup, allows the second work cycle to begin. This identification device is of known type and is disclosed in European Patent Application no. 94830589.1.

A container 2 is predisposed internally of the machine; the cups introduced into the machine are sent to be collected in this container 2. The cup inlet is connected to the container 2 by an internal track in the machine.

The machine further comprises a dispenser which returns a deposit to a user in exchange for a cup once said cup has been identified and accepted by the identification device.

The machine further comprises a washing device for the cups, arranged along said track, which washing device empties the transiting cups by turning them upside down. In the figures the washing device 3 is only partially represented. The washing device 3 comprises two seats 4, each of which houses a cup 6. The seats 4 are mounted on a frame 5 which is rotatable about a horizontal axis. The two seats 4 are arranged on the frame 5 at diametrically opposite positions with respect to the rotation axis of the frame 5, and are open on one side for lateral introduction and expulsion of the cup 6. The frame 5 is made to rotate intermittently, causing the seats 4 to stop at a top and a bottom point in their trajectory. At said top point is located a loading station, which has the task of housing a newly-accepted cup arriving from the inlet; said cup 6 is housed in an upright position in the seat 4. At the bottom point of the trajectory (whereat is situated the washing station 3) the cup is upturned so that it can empty any residues left therein, which residues are then collected in a special underlying recipient. The washing station 3 is provided with a nozzle which on command sprays a jet of water upwards against the internal walls of the cup. Each time a cup 6 enters the seat 4 positioned at said top point, the frame 5 is made to rotate by half a revolution such that the seat 4 initially at the loading position is moved into the washing position, and vice versa.

The washing device 3 is further provided with means for holding the cup 6 in the seat 4, comprising a rail arranged along the trajectory of the seat 4 as it moves from the loading station to the washing station, which rail is constituted by two arced parallel rods 7.

The washing device 3 further comprises a fixed ejector 8, located along the cup track immediately downstream of the of the washing station. The ejector 8 is constituted by a curved rod arranged crosswise with respect to the advancement direction of the cup in such a way that the cup, drawn by the mobile frame 5, strikes with its lateral wall against the ejector 8 and exits from the seat 4 through the lateral aperture thereof.

The a foregoing description relates to characteristics which are common to the machine of the invention as well as to other known machines.

The machine of the present invention comprises an operative group 1 arranged along the cup track downstream of the washing device 3, which is operative group 1 is crossed by cups transiting along said track. The operative group 1 has the task of forming a stack 9 of cups and of locating said stack 9 internally of the container 2 in a pre-determined position.

The container 2 is constituted by a box of the type used for packing plastic cups, wherein the cups are boxed in stacks arranged vertically one by the side of another.

The operative group 1 comprises a support 14, which supports the cup at the bottom of a stack of cups arranged vertically, and which can be brought on command from an active configuration, in which it interacts with the cup at the base of a stack so as to hold the stack up, into an inactive configuration, in which it does not interact with the cup, and lets the stack 9 descend.

The support 14 is provided with two arms 15, which can be neared and distanced one from the other on command.

In the active position of the support 14, the arms 15 are neared one to the other up to a predetermined distance; between one arm 15 and the other there is a circular aperture of a predetermined diameter, in which the cup 6 at the base of the stack 9 is housed; the cup rests by its upper lip on the edge of the aperture defined by the arms 15.

In the inactive position the arms 15 are distance one from the other such that the cup can freely pass between them. In the accompanying figures the support 14 is shown in the active configuration. The support 14 can be made in such a way that the cup rests not by its lip but by its lateral wall or by its base.

The operative group 1 further comprises a vertical-axis tubular body 11 provided with an upper inlet 12, positioned above the support 14, and a lower outlet 13 for the cups 6 which guides a cup on to the top of a stack of cups supported by the Support 14. The above mentioned stack elevates vertically internally of the tubular body 11.

Two apertures 18 are afforded in the wall of the tubular body 11, into which apertures 18 the arms 15 insert into the cavity of the tubular body 11. The operative group 1 is mobile on command between a loading position in which it receives, through the upper inlet 12 of the tubular body 11, the cups 6 transiting along the track, and at least one unloading position in which the operative group 1 has its lower outlet 13 positioned above the container 2. For this purpose a mobile element 19 is provided, whereon are mounted the tubular body 11 and the support 14. The element 19 is slidable on command along a horizontal beam 21 slidably coupled at its ends on straight horizontal guides 22 situated perpendicularly to the horizontal beam 21 and overlying the container 2. In the accompanying figures the operative group 1 is shown in the loading position.

A rod 23 is also provided, having an upper end 24 which is located by the side of the ejector 8 at the cup outlet side from the washing device 3 and above the tubular body 11 in the loading position. The rod 23 is rotatably coupled with the washing device 3 about a pivot: 28 having a normal axis to the rods 7, said rod 23 being fixable in a predetermined position by means of a fixing screw. The upper end 24 of the rod 23 is positioned in such a way that the cup 6 expelled from the washing device 3 strikes against said upper end 24 and tilts the cup 6. In particular, the end 24 interacts with the internal wall of the cup 6 in proximity of the lower edge 6a of the cup 6 (see FIGS. 4 and 5).

Figure 2:
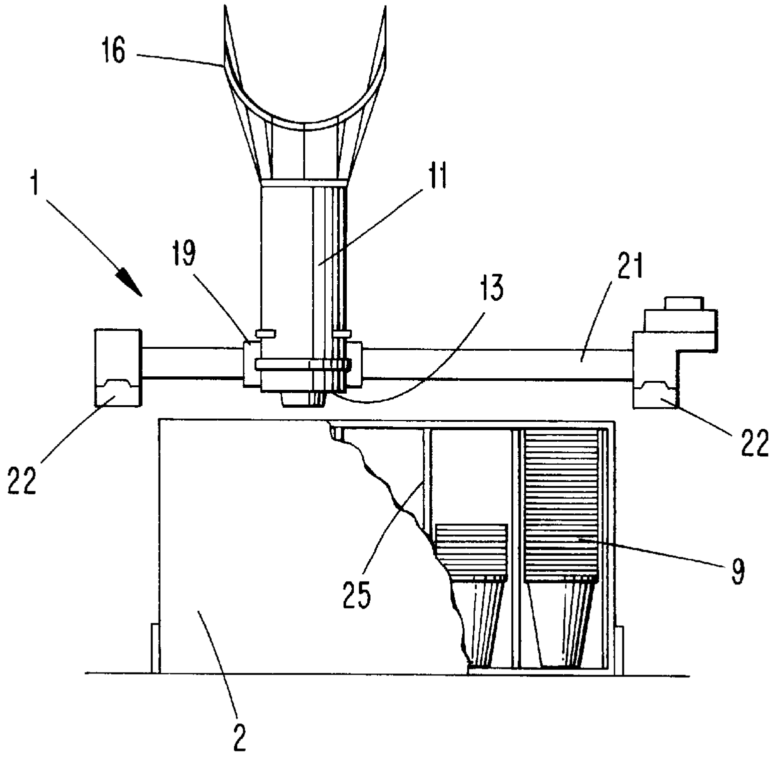
FIG. 2 is a schematic lateral view from below of FIG. 1, with some parts removed better to evidence others.
Figure 3:
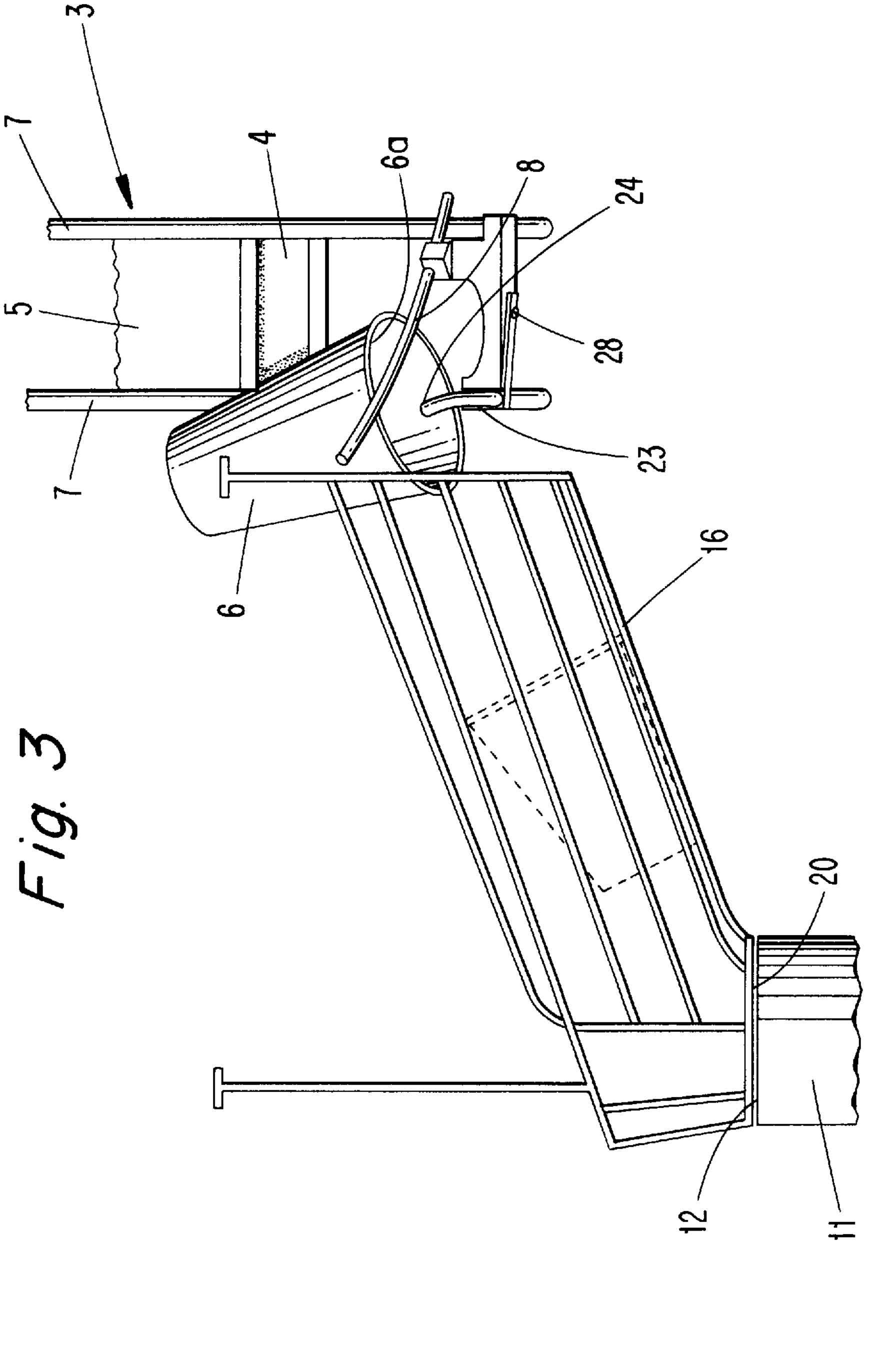
FIG. 3 shows, in enlarged scale, a lateral view from the left of a detail of FIG. 1, with a part of the washing device evidenced.

Also provided are means for guiding the cup 6 exiting from the washing device 3 towards the upper inlet of the tubular body 11. Said means comprise, in a first embodiment shown in FIGS. 1, 2 and 3, a fixed slide 16 arranged along said cup track, which is crossed by the cups 6 transiting along the track and is provided with a sliding surface which is downwards inclined, is concave, grill-shaped and which terminates with an outlet mouth 20 located immediately above the upper inlet 12 of the tubular body 11 in loading position. Any liquid remaining in the cup 6 is discharged through the holes in the grilled surface of the slide 16.

Figure 5:
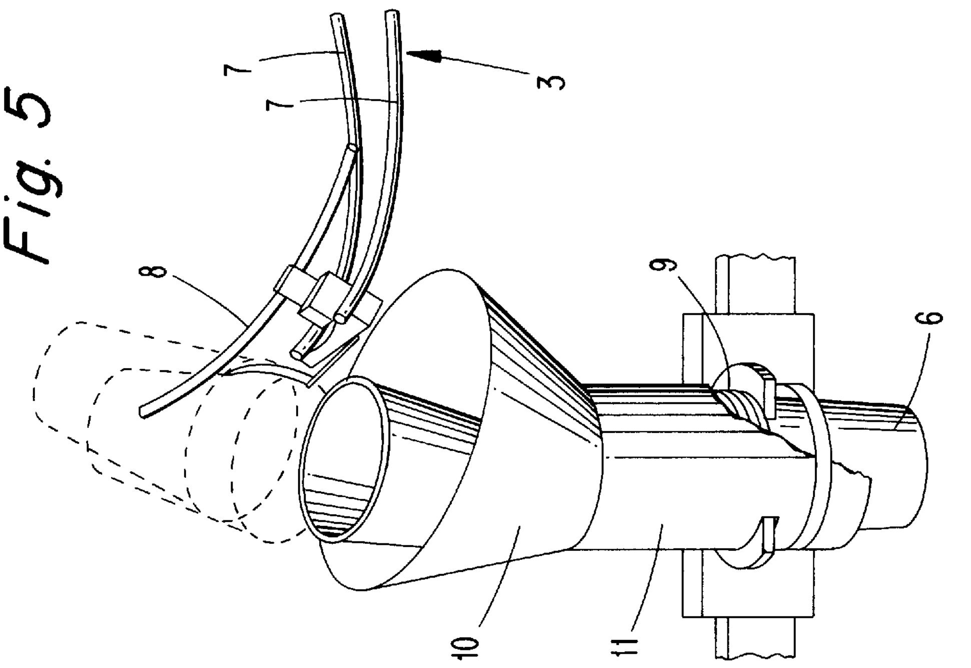
FIGS. 4 and 5 are two vertical elevations of a detail of a second embodiment of the invention, showing some sequential operative positions of the cup exiting from the washing device 3.
Figure 4:
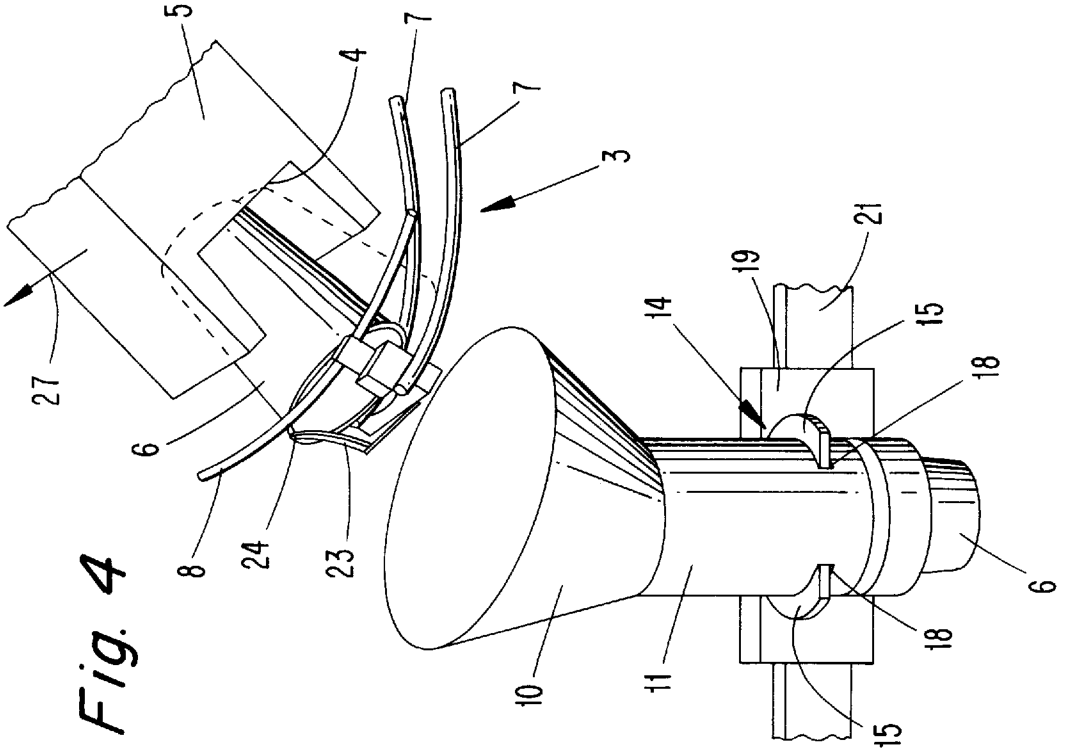

Said means for guiding the cup comprise, in a second embodiment shown in FIGS. 4 and 5, a funnel-shaped element 10 which is mounted solidly to the tubular body 11 above the upper inlet 12, which captures the cups 6.

A framework of flat walls 25 can be positioned internally of the container 2. This framework defines a plurality of vertical compartments 26, each of which can house a stack 9 of cups. The framework 25 is conformed such as to be vertically removable from the container.

When the machine identifies and accepts a cup 6, the frame 5 rotates forwards (in the direction indicated by the arrow 27), by half a revolution. During the rotation the cup 6 in the washing station 3 is expelled laterally from the seat 4 by the ejector 8, and is tilted by the upper end 24 of the rod 23 which constitutes a sort of obstacle in the path of the cup 6. The cup 6 then falls, more or less straight, into the means for guiding the cup 6 towards the upper inlet of the tubular body 11. Said tubular body 11 is already in the loading position. The cup 6 is placed on the stack forming internally of the tubular body 11. The support 14 is in the active configuration, with the cup 6 on the bottom of the stack resting on it.

When the stack 9 is full, which will be detected by a sensor of known type and not represented in the figure, the mobile element 19 is moved by a motor of known type (and not represented in the figure) to bring the tubular body 11 into the unloading position, that is vertically to an empty or not-yet-full compartment 26. At this point the support is brought into the inactive configuration, and the arms are distanced 15. The stack thus falls into the compartment 26; after which the mobile element 19 brings the operative group 1 back into the loading position and the support newly returns into the active configuration.

When all of the compartments 26 have been filled, the container 2 is extracted from the machine and the framework 25 is removed, to be placed inside another, empty container 2, which is then inserted into the machine and filled with stacks 9 of cups 6.

The cups 6 are thus stacked in such a way as to occupy a very small space.

The used cups 6, emptied, washed and arranged inside the container 2, can be easily transported towards the recycling or destruction point. Since the cups 6 are stacked vertically, any liquid remaining in them will not fall onto the cardboard of the container 2, wetting it, but will stay in the cups 6.

The invention also eliminates the need to make two different collections of containers; that is, the ones the cups 6 are originally packed in and those used to collect the used cups 6.

Furthermore, the used cups 6 can be returned to the supplier—who then proceeds to their destruction, or, as in the case of reusable cups 6, their sterilization for reuse, and then stacks them in the same kind of container that they arrived in. This leads to considerable advantages both of movement and of stocking of used cups.

We claim:

1. A machine for collecting used cups, comprising:

an inlet for the cups, through which a cup can be introduced into the machine;

a container, situated internally of the machine, in which a plurality of cups can be collected;

a track located internally of the machine and connecting the inlet for the cups with the container;

wherein a cup arriving from the inlet is housed in an upright position on the track and turned upside-down by moving along the track on arrival at an operative group arranged along said track, which cup crosses said operative group transiting on said track, which operative group creates a stack of cups, and locates said stack internally of the container in a single pre-determined orientation, wherein said operative group comprises a support for supporting a cup situated at a bottom of said stack of cups arranged vertically, which support is movable from an active configuration, wherein the support supports the cup at the bottom of the stack to an inactive configuration, wherein the stack falls, which support is provided with two arms which can be neared and distanced one from another therein in said active configuration of the support the two arms are neared such that a cup at the bottom of the stack rests on said two arms and in said inactive configuration said two arms are distanced in order not to interact with said cup.

2. A machine according to claim 1, further comprising an ejector located along the track to tilt the cup in direction to the operative group to form a stack of cups, and wherein said single predetermined orientation is the upright position.

3. A machine according to claim 1, wherein said operative group comprises a tubular body having a vertical axis, which tubular body is provided with an inlet positioned above said support, and an outlet for guiding the cups into a position on top of said stack of cups supported by the support with said stack increasing vertically internally of the tubular body.

4. A machine according to claim 3, wherein said operative group is movable between a loading position in which it receives, through the inlet of the tubular body, the cups transiting along the track, and at least one unloading position in which the outlet is maneuvered above the container to a pre-determined position.

5. A machine according to claim 3, wherein said operative group comprises a mobile element on which the tubular body and the support are mounted.

6. A machine according to claim 5, wherein said mobile element is slidable along a horizontal beam which is slidable along horizontal straight guides perpendicular to the horizontal beam and overlying the container.

7. A machine according to claim 1, further comprising a washing device for the cups arranged along the track upstream of the operative group and crossed by the cups transiting along the track, said washing device upturning the cups.

8. A machine according to claim 7, wherein said ejector is configured to laterally expel the cups from the washing device when said cups are in upturned position.

9. A machine according to claim 8, further comprising a rod having an upper end located by a side of the ejector in a position whereat a cup exits from the washing device and above said tubular body in a loading position, the upper end of the rod being positioned such that a lower edge of a cup strikes thereagainst once a cup is expelled from the washing device, whereby said upper end upturns said cup.

10. A machine according to claim 3, further comprising a funnel-shaped element mounted solidly to the tubular body above said inlet for catching said cups when they fall.

11. A machine according to claim 4, further comprising a fixed slide arranged along said track and constituting a part of said track which a cup internally follows in the machine; said slide exhibiting a downwards-tilted sliding surface, said surface being concave and terminating in an outlet mouth located above the inlet of the tubular body in loading position.

12. A machine according to claim 11, wherein the sliding surface of the slide exhibits a grill configuration.

13. A machine according to claim 11, further comprising two apertures provided in a wall of the tubular body, through which two apertures the two arms can reach into a cavity of the tubular body.

14. A machine according to claim 1, further comprising a framework of flat walls, which are positionable internally of the container and which constitute a plurality of vertical compartments, each of which can house a stack of cups.

15. A machine according to claim 14, wherein said framework of flat walls are removable in a vertical direction from the container.

* * * * *